Oct. 23, 1934. A. WEILAND 1,978,179
VEHICLE BUMPER
Filed May 10, 1933
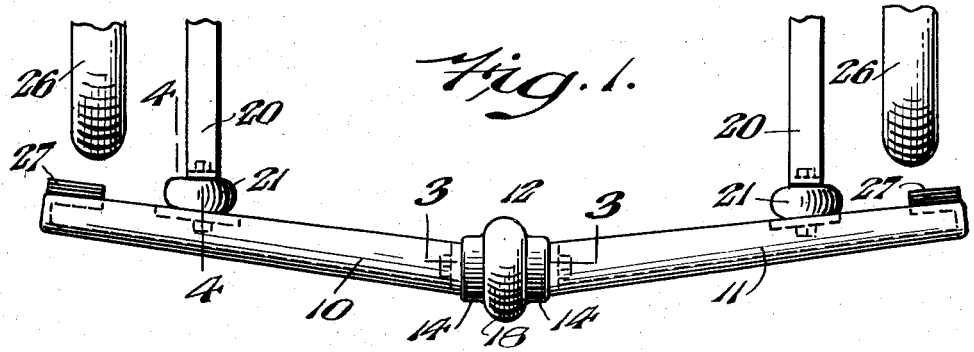
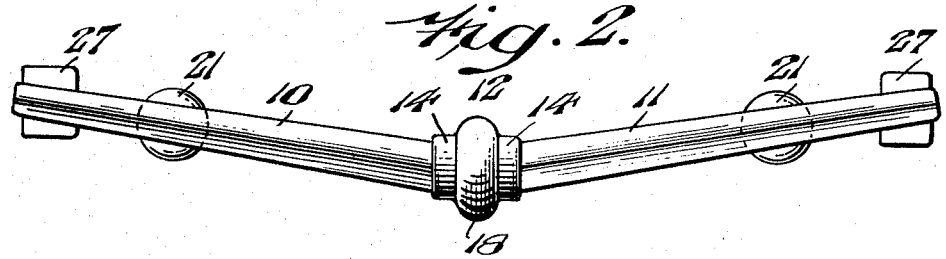
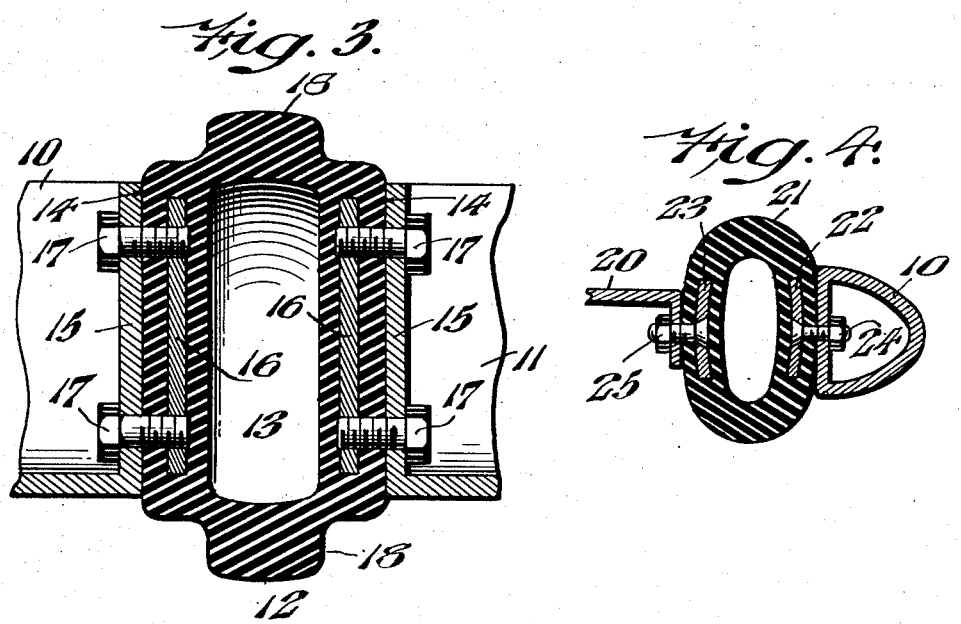
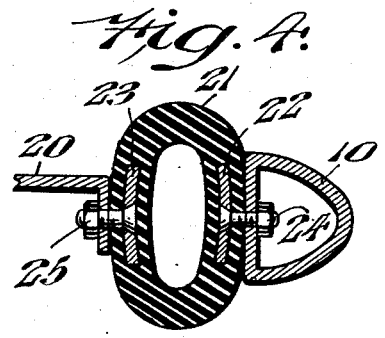
INVENTOR
ALFRED WEILAND,
BY
ATTORNEY Patented Oct. 23, 1934

1,978,179

UNITED STATES PATENT OFFICE 1,978,179

VEHICLE BUMPER

Alfred Weiland, Germantown, Pa.

Application May 10, 1933, Serial No. 670,289

7 Claims. (Cl. 293—55)

The present invention relates to vehicle bumpers and more particularly to a bumper composed of rigid and flexible material.

Some of the objects of the present invention are to provide an improved bumper for automobiles and other vehicles; to provide a bumper wherein impacts ordinarily heavy enough to distort, break or otherwise damage an ordinary bumper are so distributed as to be absorbed without the usual deformation of the bumper member; to provide a semi-rigid bumper capable of absorbing maximum impacts without damage; to provide a sectional bumper operating through cushioning elements to give in addition to rigidity a highly desirable flexibility; to provide a bumper wherein end impacts and excessive transverse blows are resisted by the supplemental action of the tires of the vehicle; and to provide other improvements as will hereinafter appear.

In the accompanying drawing Fig. 1 represents a plan of a vehicle bumper embodying one form of the present invention and shown arranged in operative relation with respect to the wheels and frame of the vehicle; Fig. 2 represents a front elevation of the same; Fig. 3 represents a sectional detail on line 3—3 of Fig. 1; and Fig. 4 represents a section on line 4—4 of Fig. 1.

Referring to the drawing one form of the present invention consists of two main bumper sections 10 and 11 of material capable of resisting impacts transmitted transversely thereto, such for example as rigid steel of tubular section or any other shape suitable for the purpose.

In order to provide a bumper of greater flexibility than is possible in the ordinary one piece bumper construction, the bumper sections 10 and 11 are arranged in end to end relation and interconnected by a resilient member 12 which is preferably formed of rubber or rubberized fabric molded with an internal air filled chamber 13. The two opposite side walls 14 of this hollow member 12 are each flat or plane surfaces so as to seat the respective flat end plates 15 of the sections 10 and 11 in an efficient and practical manner for interconnection. As here shown these walls 14 are relatively thick and each has an anchor plate 16 molded therein which is apertured and tapped to receive fastening studs 17 by which the sections 10 and 11 are attached to the member 12. Thus as assembled the bumper consists of two relatively rigid impact resisting sections and a central molded cushion member 12, which latter allows a novel medial flexing of the two impact sections about the cushioning member as an axis. It should also be noted the impact area of the member 12 is formed by a circumferential area 18 of increased thickness, as compared to the walls 14 and of a width sufficient to form an appreciable impact receiving surface. This width together with its thickness provides the desired elasticity for relative movement of the sections 10 and 11 while restraining vibration and preventing any tendency of the joined parts to flap back and forth.

In accordance with the present invention the sections 10 and 11 are supported across the side frame bars 20 of the vehicle, each being attached to its bar 20 through a hollow cushion shock absorber 21 formed of rubber or rubberized fabric or any other resilient material. The front and rear walls of each of the absorbers 21 have anchor plates 22 and 23 molded therein whereby fastening bolts 24 and 25 provide for the attachment of each absorber 21 to the frame bar 20 at one side and for the attachment and support of a bumper section at the other side.

The length of the assembled bumper is such as to bring its ends respectively in front of the wheel tires 26 of the vehicle, and that portion of each end which is juxtaposed with respect to the adjacent wheel is provided with a block or pad 27 of rubber or other suitable cushioning material. The function of these pads 27 is to abut the wheel tire under severe impacts on the bumper ends so that the resisting action is promptly reinforced by the pneumatic tire and deformation or bending of the bumper sections prevented.

From the foregoing it will be evident that a complete unitary bumper construction has been devised wherein rigid bumper sections are provided for absorbing direct maximum impact but owing to the novel cushion mounting between the sections 10 and 11 all danger of distortion of the aforesaid sections is eliminated. Thus any impact on one section alone is taken by the stiff bar of that section and absorbed by the absorber 21 while the member 12 allows the impacted section to flex freely relative to the other section. Also a direct forward impact against the member 12 allows both sections 10 and 11 to yield inwardly to initially tighten the shock and then the impact is distributed laterally and rearwardly to be taken up by the absorbers 21.

While only a single form is shown in which this invention may be embodied, it is to be understood that the invention is not limited to any specific construction, but might be applied to various forms without departing from the spirit of the invention or the scope of the appended claims.

Having thus described my invention, I claim:—

1. A vehicle bumper comprising two metal sections, a member formed of resilient cushioning material disposed between juxtaposed ends of said sections, means for fastening each section end to said member, and means for supporting the connected sections on a vehicle.

2. A vehicle bumper comprising two relatively rigid sections, a member formed of resilient cushioning material disposed between juxtaposed ends of said sections, means for fastening each section end to said member, and means including shock absorbing elements for supporting the connected sections on a vehicle.

3. A vehicle bumper comprising two relatively rigid sections, a member formed of cushioning material disposed between juxtaposed ends of said sections, means for fastening each section end to said member, said assembled parts having a length to bring the outer ends of said sections respectively in front of the wheels of the vehicle, cushioning pads respectively attached to said outer ends and arranged to abut the tires on said wheels respectively under end impacts, and cushioning means to support said connected sections in operative position on said vehlcie.

4. A vehicle bumper comprising two relatively rigid impact receiving sections, means for resiliently connecting said sections in end to end relation, and means including shock absorbers to support the connected sections on a vehicle.

5. A vehicle bumper comprising two rigid impact bars arranged at an angle to each other and converging to a point substantially coincident with the longitudinal axis of a vehicle, a member formed of cushioning material interposed between and connected to the juxtaposed ends of said bars, and a cushioning element connected to each bar near the free end thereof for flexibly supporting such bar on the frame of a vehicle.

6. As a new article of manufacture a bumper consisting of two rigid sections interconnected in end to end relation by a cushioning member, and means including cushioning members connecting each section to the frame of a vehicle.

7. As a new article of manufacture a bumper consisting of two sections of rigid material interconnected in end to end relation by a hollow resilient member, and means including cushioning members connecting each section to the frame of a vehicle.

ALFRED WEILAND.